(12) United States Patent
Millevik

(10) Patent No.: US 9,407,031 B2
(45) Date of Patent: *Aug. 2, 2016

(54) MODULAR CONNECTOR FOR CABLES OR PIPES AND SYSTEM COMPRISING SUCH MODULAR CONNECTOR

(71) Applicant: Roxtec AB, Karlskrona (SE)

(72) Inventor: Bo Millevik, Listerby (SE)

(73) Assignee: ROXTEC AB, Karlskrona (SE)

( * ) Notice: Subject to any disclaimer, the term of this patent is extended or adjusted under 35 U.S.C. 154(b) by 75 days.

This patent is subject to a terminal disclaimer.

(21) Appl. No.: 14/314,846

(22) Filed: Jun. 25, 2014

(65) Prior Publication Data

US 2014/0308834 A1 Oct. 16, 2014

Related U.S. Application Data

(63) Continuation of application No. 13/137,800, filed on Sep. 14, 2011, now Pat. No. 8,814,596.

(30) Foreign Application Priority Data

Sep. 17, 2010 (SE) ........................................ 1050971
Mar. 11, 2011 (SE) ........................................ 1100176

(51) Int. Cl.
*H01R 13/52* (2006.01)
*F16L 5/08* (2006.01)
(Continued)

(52) U.S. Cl.
CPC ............... *H01R 13/5205* (2013.01); *F16L 5/08* (2013.01); *F16L 5/14* (2013.01); *H02G 3/22* (2013.01)

(58) Field of Classification Search
CPC .......... H01R 13/5205; F16L 5/08; F16L 5/14; H02G 3/22

USPC ......................................... 439/271; 174/21 C
See application file for complete search history.

(56) References Cited

U.S. PATENT DOCUMENTS 3,448,430 A 6/1969 Kelly
4,273,405 A 6/1981 Law
(Continued)

FOREIGN PATENT DOCUMENTS

CN 1157494 A 8/1997
DE 10119736 A1 11/2001
(Continued)

OTHER PUBLICATIONS

International Search Report and Written Opinion for corresponding international patent Application No. PCT/EP2011/065803 dated Feb. 22, 2012.
(Continued)

*Primary Examiner* — Timothy Thompson
*Assistant Examiner* — Charles Pizzuto
(74) *Attorney, Agent, or Firm* — Harness, Dickey & Pierce, P.L.C.

(57) ABSTRACT

A modular connector for cables and pipes has a compressible body with an axial groove provided therein for arrangement of a shielded cable extending from a first end to a second end, and the groove is dimensioned or dimensionable to sealingly fit around a circumference of the shielded or armored cable or the pipe. The connector has a conductor arrangement arranged between the first end and the second end, the conductor arrangement may be sandwiched between the compressible body and a cable screen or armor of the cable or the pipe. The the conductor arrangement further extends to an outside of the modular connector.

29 Claims, 4 Drawing Sheets

(51) Int. Cl.
*H02G 3/22* (2006.01)
*F16L 5/14* (2006.01)

(56) References Cited

U.S. PATENT DOCUMENTS

| | | | |
|---|---|---|---|
| 4,490,576 | A | 12/1984 | Bolante et al. |
| 5,059,747 | A | 10/1991 | Bawa et al. |
| 5,083,929 | A | 1/1992 | Dalton |
| 5,493,068 | A | 2/1996 | Klein et al. |
| 5,804,770 | A | 9/1998 | Tanaka |
| 5,951,327 | A | 9/1999 | Marik |
| 6,422,900 | B1 | 7/2002 | Hogan |
| RE38,294 | E | 11/2003 | Nattel et al. |
| 8,814,596 | B2 * | 8/2014 | Millevik .................. F16L 5/08 174/78 |
| 2006/0272241 | A1 * | 12/2006 | Kreutz ..................... F16L 5/08 52/220.1 |

FOREIGN PATENT DOCUMENTS

| | | |
|---|---|---|
| EP | 0058876 A2 | 9/1982 |
| EP | 0948110 A1 | 10/1999 |
| EP | 1479958 A1 | 11/2004 |
| EP | 2101384 A1 | 9/2009 |
| FR | 2652207 A1 | 3/1991 |
| GB | 2156169 A | 10/1985 |
| JP | H09107189 A | 4/1997 |
| TW | 200936014 A | 8/2009 |
| WO | WO 99/45619 | 9/1999 |
| WO | WO 2006/130104 | 12/2006 |
| WO | WO-2010089286 A2 | 8/2010 |

OTHER PUBLICATIONS

English Translation of Office Action for Japanese Patent Application No. 2013-528633 dated Sep. 29, 2015.
Hungarian Search Report dated Apr. 17, 2014.
Feng Wangjun et al, "Conductors and Electrical Medium in an Electrostatic Field and Section 7.1.4 Electrostatic Shielding" College Physics, vol. 1, Chapter 7, p. 187, lines 7-12, with partial English translation as a statement of relevance.
English Translation of Office Action for Taiwanese Patent Application No. 100133127 dated Sep. 22, 2015.
Office Action for Chinese Patent Application No. 201110282080.0 issued on Apr. 28, 2016 and English Translation thereof.

* cited by examiner

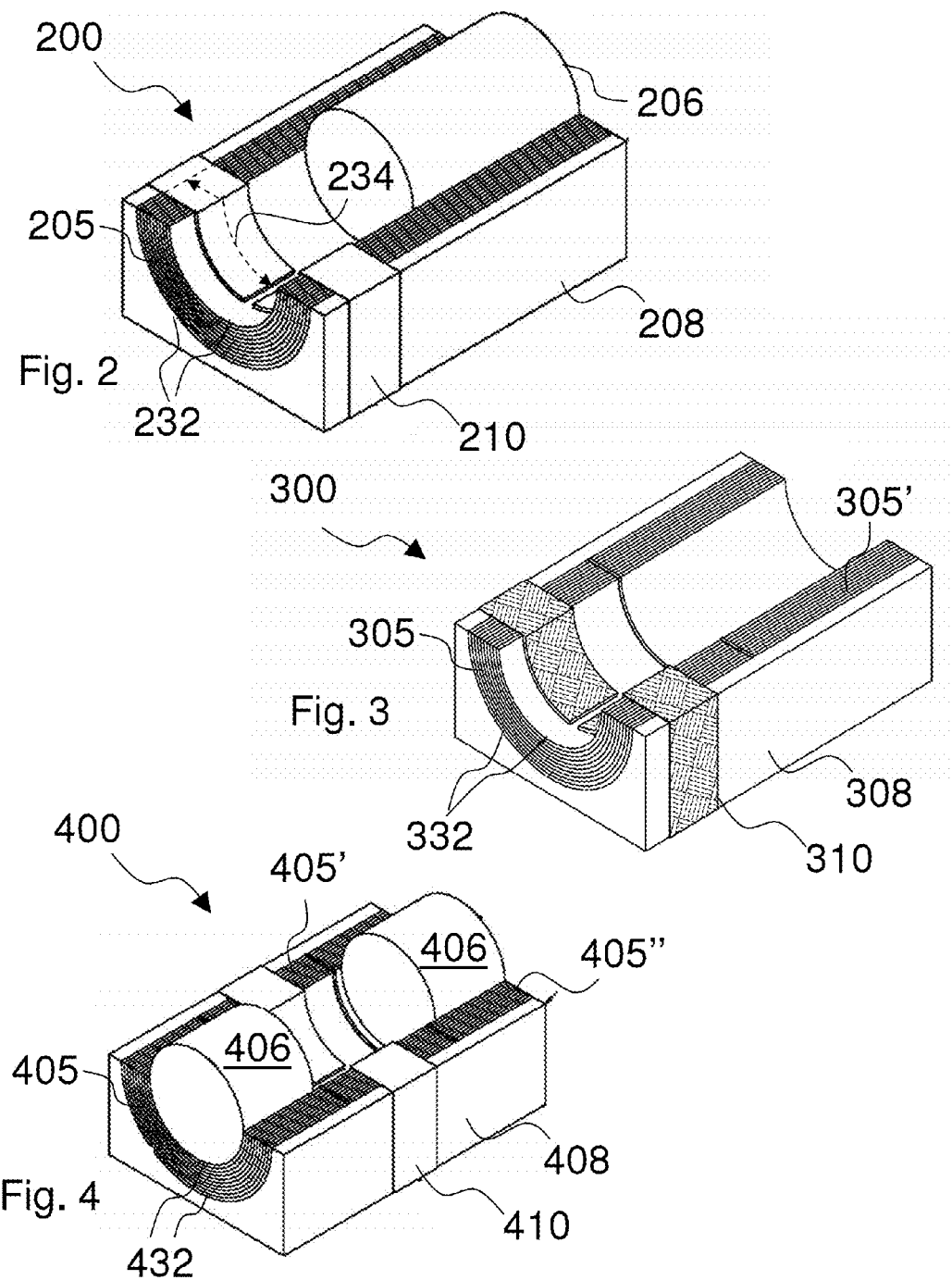

MODULAR CONNECTOR FOR CABLES OR PIPES AND SYSTEM COMPRISING SUCH MODULAR CONNECTOR

This application is a continuation application of and claims priority under 35 U.S.C. §120/121 to U.S. application Ser. No. 13/137,800 filed Sep. 14, 2011, which claims priority under 35 U.S.C. §119 Swedish patent application number SE 1050971-9 filed Sep. 17, 2010 and Swedish patent application number SE 1100176-5 filed Mar. 11, 2011.

TECHNICAL FIELD

The present invention concerns a modular connector enabling efficient grounding or bonding of pipes, or cables provided with a shield, screen or armor. The present invention also relates to a system comprising one or several modular connectors of the above kind.

BACKGROUND

Electrically shielded cables, or cables comprising a cable screen or shield made of an electrically conductive material have several applications. The purpose of the screen may be to maintain the quality of the signal conducted through the shielded cable, or to screen the surroundings from electromagnetic interference (EMI) caused by the signal conducted through the cable, or vice versa. Cables may also be provided with an armor, a metallic enclosure surrounding the cable. Even if the definition would be a bit forced, one might say that the screen or shield serves its function continuously, preventing EMI from travelling into or out of the cable while the armor serves it purpose of preventing sudden failure, since it mechanically prevents the cable from being damaged, or prevents a more severe failure, since it is often used to bond the cable with ground (earth potential).

In practice, and for the purpose of the present invention, the purpose is seldom so well-defined since the screen or shield will also prevent the cable from being damaged (which is the purpose of the armor), at least to some extent, and the armor will also prevent EMI from passing (which is the purpose of the screen or shield). This will be discussed in some more detail in the detailed description.

According to codes for electrical installation and several national and international standards, such shielded or armored cables may be grounded as they pass a structure or is terminated, e.g. for with the purposes of bonding the cable with the surroundings or to prevent radio frequency interference (RFI) from passing through a bulkhead. Examples of such standards include. IEC 62305-x, EN 50164, UL 514B and CSA22.2.

The disclosure of the present application mainly relates to applications where a bond to ground is required and/or potentially high currents have to be lead away, e.g. grounding in high-power applications, bonding and equipotential bonding and lightning protection. In general the present invention may be used in electrical installations where high current carrying capabilities are required. Examples of typical cables used are metal clad cables and TECK cables, and also wired armoured cables (e.g. SWA cables) and wired braid cables (e.g. SWB cables) i.e. high-performance cables with a metal casing, which cables may be used in hazardous environments.

Two typical families of connectors for this type of cables are commonly available:
1) A low tech solution, wherein a regular cable connector is used and wherein the grounding function is provided by a grounding wire connected to the cable outside of the constraints of the connector.

This solution has benefits in that the performance is readily verifiable since the grounding location is exposed and accessible. Some drawbacks emanate from this advantage, i.e. from that both the grounding wire and the grounding location is exposed. The risk of intentional or unintentional damages increases, and if a failure occurs such that a current is lead through the grounding cable the exposed position or the grounding cable may pose a risk for secondary damage (damage to a nearby person or nearby equipment).

2) A connector in accordance with e.g. U.S. Pat. No. 5,059,747 or US-RE-38,294 E, where a grounding element is forced towards the cable screen as a pair of gland nuts are forced towards each other, or by a similar function.

One advantage of this solution is that the grounding position is protected inside the connector. One drawback of this solution is that the connectors are not readily adjustable to cables of various dimensions. Installations using this type of connectors may also suffer from not being so area efficient. Each gland must be accessible such that torque may be applied for it to function properly.

Further background art is reflected by EP-A-058 876 which discloses an apparatus for shielding electric and electromagnetic waves.

The present invention relates to a novel cable connector addressing the known drawbacks of prior art as well as providing further advantageous features which will be obvious from the following description.

SUMMARY

The objects of the invention have been achieved by the novel technology having the features set forth in the appended independent claims; preferred embodiments being defined in the dependent claims related thereto.

To this end the present invention relates to a modular connector having a compressible body and being suitable for use with shielded or armored cables, or with pipes. The compressible body has an axial groove provided therein for arrangement of a shielded cable extending from a first end to a second end, and the groove is dimensioned or dimensionable to sealingly fit around a circumference of the shielded or armored cable or pipe. For accomplishment of the desired grounding or potential equalization the modular cable connector comprises a conductor arrangement arranged between the first end and the second end, such that the conductor arrangement may be sandwiched between the compressible body and the cable, wherein the conductor arrangement further extends to an outside of the modular connector. The conductor arrangement comprises at least two conductors following a non-linear path. The use of a compressible body (which is resilient too) as a pushing means for forcing a conductor arrangement towards the cable (or pipe or wire) is particularly beneficial, since the contact surface between the conductor arrangement and the cable may be optimized. This is due to the fact that the conductor arrangement will be able to fully adapt to the shape of the cable (or pipe or wire) for the accomplishment of proper abutment and favorable conditions for electrical contact. One further benefit is that since a conductor arrangement is sandwiched between the compressible body and the cable (or pipe or wire) the amount of air having access to the cable (or pipe or wire) will be limited. Further, the conductor arrangement may be very resistant to corrosion and have a high conductivity.

According to one aspect of the present invention there is provided a modular connector for cables or pipes, comprising a compressible body having an axial groove provided therein for arrangement of a shielded or armored cable or a pipe extending from a first end to a second end, wherein the groove is dimensioned or dimensionable to sealingly fit around a circumference of the shielded or armored cable, or pipe, wherein the modular cable connector comprises a braided wire arranged between the first end and the second end, wherein the braided wire is arranged to be sandwiched between the compressible body and a cable screen or armor of the cable, or the pipe, the braided wire further extending to an outside of the modular connector for cables or pipes.

According to one or more embodiments the compressible body comprises a recess through which the conductor arrangement for instance in the form of a braided wire extends to the outside of the modular cable connector, enabling the use of a braided wire of larger dimensions, e.g. since the recess will allow for two module halves to meet even if a braided wire is sandwiched between the. The recess will also localize the braided wire securely in the compressible module.

In one or more embodiments a corresponding recess extends on the exterior of the compressible body, such that e.g. the braided wire may be guided by the recess. The width of the recess will correspond to the width of the braided wire, and the depth of the recess preferably corresponds to the full thickness of the braided wire or less. The recess will position the braided wire while preventing the wire from interfering with the sealing abilities of the modular connector.

According to one or several embodiments the modular connector, in a first end thereof, is dimensioned to sealingly fit around the circumference of an intact shielded or armored cable, or a pipe. In an alternative embodiment peelable sheets, at least one peelable sheet, arranged in the axial groove or in an axial section thereof, for adjusting the diameter to the dimensions of the shielded or armored cable, or the pipe. In this way the connector will also be adapted for sealing to an even higher degree, and the peelable sheets enables sealing for cables (or pipes or wires) of several different diameters.

According to one or more embodiments of the present invention at least two separate sections having at least one peelable sheet are arranged along the length of the axial groove in order to adjust the diameter to varying dimensions of the shielded or armored cable, or pipe. The advantages of this embodiment are self explanatory, and mainly coupled to the increased adaptability of the modular connector.

Peelable sheets, or at least one peelable sheet, may in one or more embodiments be arranged in the groove between the conductor arrangement and the compressible body, such as to vary the pressure with which the conductor arrangement abuts the cable or pipe.

BRIEF DESCRIPTION OF THE DRAWINGS

FIG. 2 is a perspective view of a first half of a modular connector in accordance with a second embodiment of the present invention.

FIG. 3 is a perspective view of a first half of a modular connector in accordance with a third embodiment of the present invention.

FIG. 4 is a perspective view of a first half of a modular connector in accordance with a fourth embodiment of the present invention.

DESCRIPTION OF EMBODIMENTS

Figure 1:
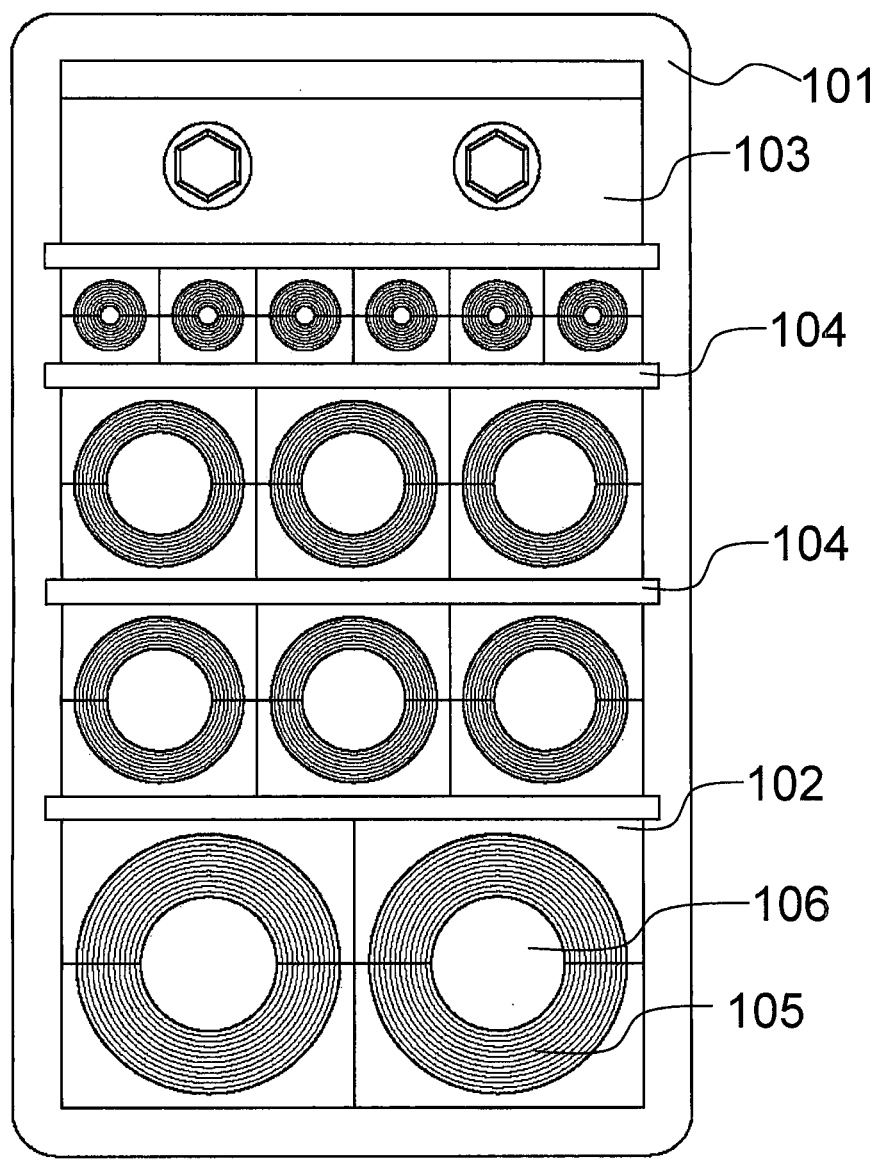
FIG. 1 is a front view of a sealing system provided with a compressible sealing module according to a first embodiment of the present invention.

To further describe the present invention a number of embodiments thereof will be described in detail in the following text, referring to the appended drawings. The reference numbers have been chosen such that the first numeral denotes the number of the drawing, and the remaining two numerals denote the type of component, independent of the drawing or embodiment referred to. The following description is directed towards cables, yet it should be emphasized that the present invention may also be used for pipes, since these are also affected by rules and regulation regarding grounding and bonding and since they often enough fit into connectors or transits designed for cables. The same is true for cable wires, which also may be subject to regulations in the context of the present invention.

FIG. 1 illustrates a sealing system comprising several modular cable connectors 102 according to a first embodiment of the present invention, seen from a first side. The system comprises a frame 101, in which the compressible modular cable connectors 102 are arranged. The modular cable connectors 102 have peelable layers 105 of material, in at least one end thereof in order to be adaptable to the outer dimensions of a cable, arranged therein. In the present embodiment each connector comprises two identical compressible bodies or connector halves, which are arranged in an opposing relationship to form the connector. The peelable layers are arranged in a groove in each connector half, which groove in this embodiment is semicircular. It should be noted that a modular connector may comprise more than two compressible bodies, or only one compressible body, without departing from the scope of the present invention. Using two or more compressible bodies has one advantage in that it simplifies assembly to a cable. The cable may be very long and having a dividable connector ensures that the connector is easily arranged anywhere along the length of the cable. Such an arrangement also simplifies retrofitting of the connector to an existing cable system.

The compressible body should be resilient, and a suitable material may be natural or synthetic rubber, such as an EPDM rubber optionally with additional fillers, but other alternatives are possible. The modular connector comprising the reference numeral 110 relates to an embodiment which will be described in later section of the present description. A rubber core 106 may be arranged to provide sealing and to position the peelable layers 105 if a cable is not arranged. Stay plates 104 may also be located between the rows of modular cable connectors 102. The stay plates 104 are in such a case slidably arranged and act to position the modular connectors 102 and to distribute the compression from the compression unit 103. For the purposes of not unduly diminishing the scope of the present invention it should be noted that there are several types of compression means available for compression of the modular connectors. Further there are also systems available which are not utilizing stay plates 104, and the present invention should not be limited in respect of these components.

The use of a resilient compressible body provides a gentle engagement with a cable, pipe or other service extending through the connector. Also the resilient nature of the compressible body results in a dampening of vibrations, which also is a beneficial feature. The compressible body may be tailormade to dampen specific vibrations.

Such a system provides an area efficient solution, in particular compared to prior art. The integrity and safety is also greatly increased as compared to a solution according to the low-tech solution as described in the background section of the present invention.

A feature which is obvious from the above and below description is that whether any current is lead directly to the frame or via a stay plate 104 and therafter to the frame 101, or if (as will be more clearly understood from the subsequent description of FIGS. 2-4) the current is first transported between conductor arrangements, e.g. braided wires, of adjacent connectors and thereafter to the frame (if a frame is used), the frame will act as a collecting bar which in turn is connected to ground. The thus integrated collecting bar in the form of the frame is less accessible than a regular collecting bar, which may be beneficial from a safety standpoint.

It should be noted that not all modular connectors in the frame have to be of the inventive kind, as long as relevant modular connectors have electrical contact with ground. In an inventive system the current may travel along several routes to reach ground, and the internal resistance for the system is low. This is one factor that results in the capability of transporting large currents without failure.

An inventive connector will in most embodiments provide a sealing function, yet in an actual application this sealing ability may not be utilized since the properties of the inventive connector as a connector alone are advantageous enough compared to prior art systems.

FIG. 2 illustrates a second embodiment of the present invention, which may correspond to the embodiment illustrated in FIG. 1, or which may at least be arranged in a similar system as the one illustrated in FIG. 1. The perspective view of FIG. 2 essentially illustrates one of two connector halves 208 used for a modular cable connector 200 according to the second embodiment. It is seen how the compressible body 208 has an axial, semicircular groove extending from a first end to a second end of the compressible body, and that peelable sheets 205 of material are arranged in the groove 232. A blind 206 or rubber core is also shown, yet it is removed prior to the arrangement of a cable therein. In the illustrated embodiment the blind 206 does not extend the full length of the connector, and in particular it does not extend over the portion where a conductor arrangement in the form of a braided wire 210 is arranged.

The blind may in one or more embodiments be provided with a cut-out portion, as illustrated will be described in detail in reference to FIG. 6. A length of braided wire 210 extends in a cross direction from an approximate middle of the groove, around the circumference of the connector half 208, to the approximate middle of the groove, such that the first end of said length faces the second end and such that the braided wire 210 connects an "inside" of the connector (which is not accessible during use) to an outside (which may be accessible during use, or at least may be in contact with surrounding equipment). The braided wire 210 may be dimensioned to the particular field of use. In use, an outer jacket of a shielded cable 520 is stripped in a small segment thereof such as to expose the cable screen (or shield or armor, whichever is applicable) in that segment. There are also several alternatives for the braided wire, and the conductor arrangement as such, yet a tinned copper wire is a suitable choice for several applications, e.g. since coating the copper wire with tin provides it with even more durability, longevity and strength adding to the beneficial properties of copper wires as such. The cable 520 is then arranged in the connector 200 such that the braided wire 210 abuts the stripped segment, providing an adequate electrical connection. As the modular cable connector 200 is compressed the braided wire 210 will be forced towards the screen, and since both the compressible body 208 and the braided wire 210 are flexible, the contact area will be maximized. This may be of particular importance since metallic armor often has an irregular surface, e.g. corrugated or ridged. The maximized contact area will reduce the electrical resistance and enable high currents to flow from a screen 522 (see FIG. 5 and the corresponding description) to the braided wire 210 without excessive heat generation. Also, even if the area of the electrical coupling is not completely evacuated from air, the amount of air present will be reduced due to the significant compression. Further, the contact area will be surrounded by electrically insulating material. Both the latter effects are believed to contribute to that higher current are enabled to flow without the risk of sparking or that the grounding cable (e.g. the braided wire) burns off, which may occur if the contact area would be exposed. The reduction of the risk of sparking is a particular benefit when using a cable connector in a location where the risk of explosion is imminent (due to high amount of flammable fumes, etc). Even if a spark would occur, the seal between the cable and the environment would be small enough to prevent the potential ignition from propagating.

In the embodiment of FIG. 2 it is expected that the resilient nature of the compressible body 208 and the braided wire 210 in combination with the reduction in cable diameter caused by the removal of the screen or outer jacket 522 (see FIG. 5 and corresponding description) will assist in the accomplishment of a tight seal.

The third embodiment, as illustrated in FIG. 3, does not completely rely on this assumption. Firstly, since the view of FIG. 3 is very similar to FIG. 2 it is considered superfluous to repeat the description of components being obvious from the reference numerals in combination with the description of FIG. 2, yet it may be noticed that the blind or core is missing from the view of FIG. 3. However, focus will be put on the main difference, which lies in the arrangement of peelable sheets 305, 305'. In the present embodiment the peelable sheets are arranged in two separate sections 305 and 305', divided cross the axial, length direction of the connector half 308. The braided wire 310 is arranged in (or "on") one section 305. In this way, variations in the inner dimensions of the modular connector 300 may be adjusted beyond the interval reachable by means of the inherent resilience of the compressible body 308 and the braided wire 310. Such a variation may occur if the diameter (or circumference) of the cable 520 varies significantly over the comparably short length of the connector 300. An expected reason for the variation is that one or several layers of the cable have been removed along part of the length of the connector, in which case the number of peelable sheets to be removed may differ between the two sections, such that the effective diameter of the groove 332 may be varied in the length direction.

The embodiment of FIG. 4 is even more elaborate in this respect, since it comprises three such sections 405, 405' and 405", in which an effective diameter of the groove 432 may be varied. In the embodiment of FIG. 4 the braided wire 410 is arranged in the middle section 405', which enables a tight seal to be obtained on both sides thereof by means of the surrounding sections. One of the sections 405" may also provide a gentle positioning of the individual conductors (see the "sub-cables 528" of FIG. 5) if these are exposed. In this way abrasion resulting in cable failure and short-cuts may be prevented. This section 405" may in an alternative embodiment provide one opening for each individual conductor. An embodiment having three sections may be useful for significant size variations of the cable, e.g. if the outer jacket 522 is thick (such that an effective diameter will vary significantly when the outer jacket 522 is removed), or if the dimension of the cable is reduced stepwise as it passes the modular connector 400.

Part of the effect of the embodiments illustrated in FIGS. 3 and 4 may be accomplished by a less adaptable connector. In one or more such embodiments the axial groove of each connector half comprises sections of different effective diameters. The resulting connector will then be tailor made for cables of very specific properties and in that sense less adaptable than the embodiments utilizing peelable sheets. A groove with different effective diameters along its length may also be accomplished by arrangement of one or more inlays of various thickness in the groove of the connector half, an embodiment which is readily understood by replacing the peelable sheets in FIGS. 3 and 4 with a single inlay (with different diameter for different sections) along the entire length of the module or with a single inlay for each section, According to any of these embodiments the connector may provide a water-tight seal, which may be considered important in practical applications.

According to the embodiments illustrated thus far the conductor arrangement as a whole extends orthogonal to the axial groove of the compressible body, generally along an inner circumference of the groove (or of the peelable sheets of material arranged therein). It should be noted that embodiments in which the conductor arrangement extends parallel to the axial groove are also feasible. In such embodiment the conductor arrangement may be folded around one end of a connector half to reach an outer side thereof (a side opposite to the side comprising the groove. This is indicated by the reference numeral 110 in FIG. 1. In this way the braided wire may be connected to ground via neighboring modular connectors, stay plates or directly via a frame etc. In other embodiments the braided wire is not folded around the end, yet rather connected to ground in a more direct manner. A potential drawback with this second family of embodiments is that it may be difficult to accomplish sealing between a cable arranged in the connector and the connector in the end of the connector where the braided wire exits (the end visible in FIG. 1). An advantage may be that the braided wire is readily accessible for testing purposes, e.g. the connection between the braided wire and ground may be readily verified and tested.

In many practical embodiments the conductor arrangement, e.g. in the form of a braided wire as exemplified below may have a thickness that may interfere with the sealing or stacking abilities, of the module in which it is arranged and/or adjacent modules. The braided wire may also render the assembly more difficult. In order to lessen this unwanted impact the recess guiding the wire out of the modular connector or the connector half may extend along the full, or a part of, the outer circumference of the modular connector or connector half (or rather the compressible body thereof). The recess is not directly visible in the drawings, since the conductor arrangement is situated therein. In this way a system comprising one or more modular connectors may be assembled without the braided wires obstructing the assembly or affecting the sealing abilities of the modular connector or system of modular connectors. In a practical case the reduction of contact surface caused by the recess will obviously reduce the sealing abilities, yet the sealing abilities may be improved as compared to a case where the braided wire is simply lead along the outer circumference. The recess has a width (in the axial direction of the connector) slightly larger than the width of the braided wire to be able to accommodate to tolerances in the width of the braided wire. The depth of the recess in preferably slightly less than the thickness of the braided wire (measured in stretched condition) in order not to hamper electrical contact between the braided wire and the surrounding structure. In one particular example the depth of the recess is about 0.05-0.5 mm less than the thickness of the braided wire, preferably less than about 0.3 mm and in one or more embodiments about 0.1 mm. The dimensions may depend on the resilience of the compressible body, and in some embodiments the depth of the recess may even be equal to or exceed the thickness of the braided wire. The braided wire may in one or more embodiments be attached to the recess by means of an adhesive. The free ends of the braided wire (corresponding to the portion of the wire extending into the groove in FIGS. 2-4) may also be provided with an adhesive. In one or more embodiments the free ends of the braided wire are provided with an adhesive transfer film with a liner, such that a user may remove the liner and attach the free end to the groove after having adjusted the effective diameter of the groove.

The recess may be machined using abrasive means such as a grindstone or an abrasive belt, having adequate dimensions. It may also be molded during manufacture of the compressible body.

In still other embodiments more than one recess may be arranged, such as two or three. Also one or each recess may be dimensioned to receive more than one conductor arrangements. By adding several conductor arrangements, the current conducting capacity of the connector may be increased.

To this end the present invention also relates to a method for manufacture of a connector module according to any embodiment disclosed herein. The method comprises the steps of:

providing a compressible body having an axial groove therein, the compressible module being formed from a resilient material, arranging a conductor arrangement to the compressible body.

The method preferably comprises the step of providing a recess in the compressible body, in which recess a conductor arrangement is arranged in a subsequent step.

In one or more embodiments the recess extends from one lateral edge of the axial groove, orthogonally to the axial groove, around a circumference of the compressible body, to an opposing lateral edge of the axial groove.

In one or more embodiments the method further comprises the step of arranging an adhesive between the recess and the conductor arrangement so as to bond the conductor arrangement to the recess.

In further embodiments the method may comprise the step of arranging peelable layers in the axial groove, and in yet other embodiments the method may also comprise the step of parting such peelable layers orthogonally to the direction of the axial groove for formation of two or more sections of peelable layers.

Figure 5:
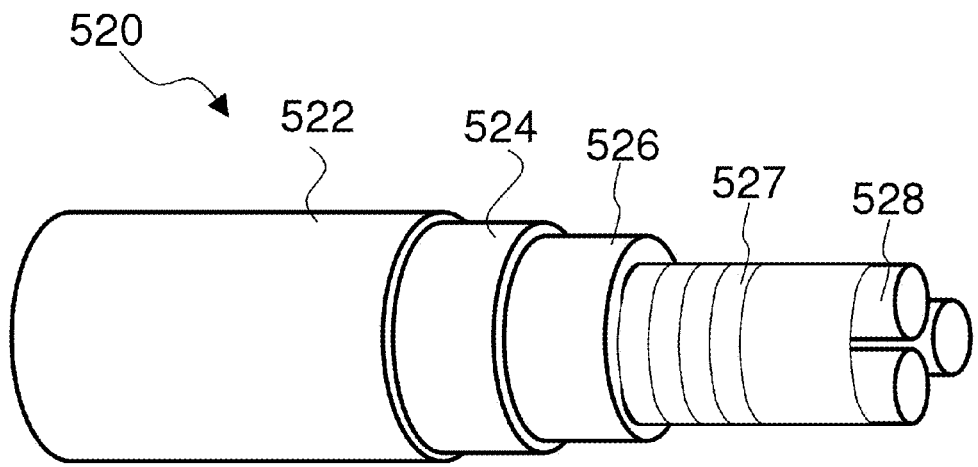
FIG. 5 is a schematic side view of a cable for which the present invention may be particularly useful.

The modular connector may be of parallelepiped shape (or brick shape) or cylindrical shape, which are the most common shapes presently, yet other shapes are foreseeable within the scope of the present invention as defined by the claims In order to appreciate the usability or even necessity of the present invention, and particular embodiments thereof it may be useful to observe a typical cable 520 which may be lead through the connector. A schematic sideview of such a cable 520 is illustrated in FIG. 5. It should be emphasized, as the skilled person realizes, that the illustrated cable is not the only type of cable 520 for which the connector according to any preceding embodiment may be used.

The cable 520 of FIG. 5 has an outer jacket 522, which may be made from PVC. The outer jacket 522 protects the armor 524, which is made from an electrically conducting material, such as helically wound, interlocking metal, or a continuous metal pipe. The armor 524 protects an inner jacket 526, which may be made from the same material as the outer jacket 522. A shielding metallic tape 527 may electrically screen the three subcables extending in (along) the inner jacket 526, wherein each subcable 528 in turn may comprise an insulation shield, a further insulation, a conductor shield and a conductor (neither of which are shown in FIG. 5). It is important to note once again that a typical cable may be this complex, yet for the present invention and embodiments thereof to be of use it does not have to be this complex. One purpose of the armor 524 is to protect the inside wiring from mechanical damages, and it will also act as a screen to prevent occurrence of EMI, even if a separate screen may be added for this purpose too (e.g. the "shielding metallic tape 527" in the example above). Another purpose of the armor 524 is to act as a safeguard in case of some sort of electrical failure, and it is therefore designed to carry high currents if such failure occurs such that it may bond the armor 524 to ground. The present invention aims at diverting these high currents from the cable armor in case of such an electrical failure. There are cables not having this type of armor 524, where the shield or screen acts as both EMI protection and bonding means. The present invention will obviously fulfill its purpose for that type of cables too. The cable may also lack a dedicated EMI screen and only be provided with the armor, in which case the present invention also may be to its advantage. The cross sectional shape and dimensions of such cables have large tolerances, which makes the inventive connector module with its resilience and adaptability to a beneficial alternative.

The skilled reader realizes that depending on if the purpose of the connector (–00) is to simply ground the cable 520 (in which case the outer jacket is present on the cable as it passes into and out of the connector (and stripped of to expose the armor in between), or if the purpose is to have the cable entering the connector with the outer jacket on in the one end and with the subcables, or the inner conductors exposed in the other end and ground the cable in between the ends, the type of connector (–00) necessary may vary. Referring to the present disclosure a connector 200 according to the second embodiment may suffice in the first situation, while a connector 400 according to the fourth embodiment may be required for the second situation, in particular if sealing at both ends of the modular connector is desired.

The present invention, according to several embodiments thereof, provides a connector having low resistance and high power durability, made from a robust and reliable material providing adequate sealing properties and proven longevity. As such the connector provides an excellent terminator for metal clad cables, TECK cables, or other armored cables. A terminator in the meaning as used in the field of the present invention relates to a device used to terminate an outer shield or jacket of a cable, i.e, to connect the shield jacket with ground and to discontinue the shield or jacket on the other side of the connector. As is obvious from the present specification the present invention according to several embodiments thereof is useful whenever a current should or may be lead from a pipe, a cable screen, shield, jacket or similar to ground, be it in a terminator or simply a transfer arranged along the length of a cable or pipe. In an embodiment where the purpose is to prevent propagation of RFI there may not even be a need for the capability of transporting high currents, yet the low internal resistance and the convenience of the connector module as such will still provide benefits for the user.

Figure 6:
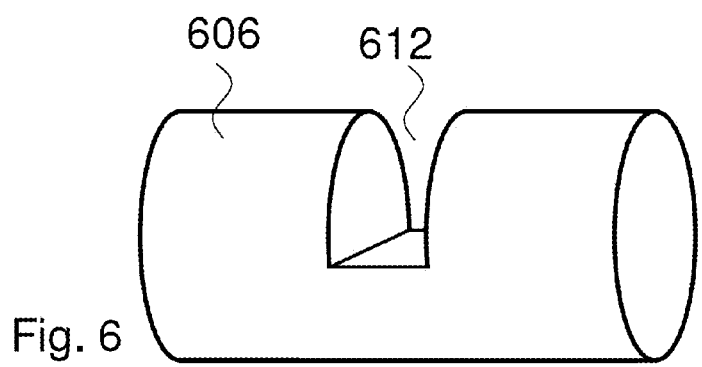
FIG. 6 illustrates a core which may be used in an assembly according to one embodiment of the present invention.

FIG. 6 is a perspective view of a core 606 which may be included in an assembly comprising a connector according to any embodiment of the present invention. The core 606 is provided with a cut-out portion 612. The cut-out portion 612 corresponds to a segment along the length of the core 606 where a significant portion of the core material has been removed. Position of the cut-out portion 612 is correlated to the position of a conductor arrangement in a connector according to the present invention. The design of the core 606 makes it possible to provide an assembly comprising two connector halves according to the present invention and a core 606 provided therein. If the cut-out portion 612 extends beyond a centerline of the core 612, as shown in FIG. 6 the cut-out portion 612 may accommodate the braided wire of both connector halves. This may also be accomplished even if the cut-out portion does not extend that far, yet it would affect the sealing ability of the module locally, which for many applications would not be a crucial issue. This solution has more than one beneficial feature. One is that the assembly, and the core arranged therein, will protect the (inner) ends of the braided wire from damage and unnecessary exposure. This is readily understood from observing e.g. FIGS. 4 and 6 in combination. Further, the core 606 will provide a support for the peelable sheets of material, if such sheets are arranged in the groove of the compressible body. Having the core 606 formed in one piece is also beneficial from an assembly standpoint.

Figure 7:
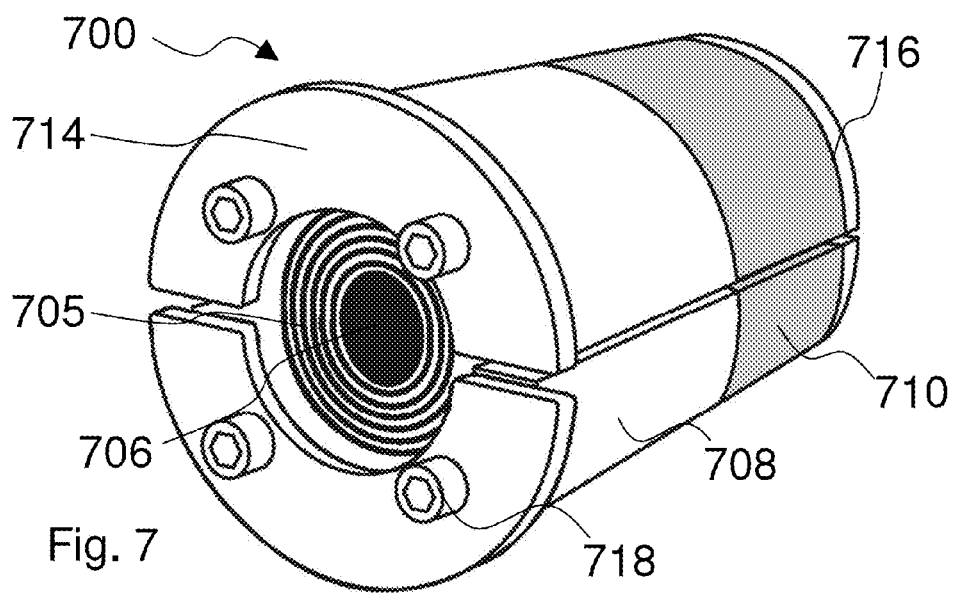
FIG. 7 is a perspective view of a system comprising a modular connector in accordance with a fifth embodiment of the present invention.

In the disclosed embodiments the compressible body 708 has a parallelepiped outer shape. The present invention is however not limited to the exact disclosure of the embodiments. The compressible body may in other embodiments have a cylindrical outer shape, and it may be composed of two semicylindrical or semiannular compressible bodies, analogues to the embodiments illustrated in FIGS. 2-4. One example is illustrated in FIG. 7, where a modular connector 700 according fifth embodiment of the present invention is shown. This modular connector is similar to the modular connectors already described, apart from the connector halves having a semi-cylindrical shape. The modular connector 700 has fittings 714 and 716, respectively, on opposing axial ends thereof, which fittings are interconnected by screws 718 extending through bores of the corresponding compressible body 708. In use the assembly as illustrated in FIG. 7 may be inserted in an opening, with a cable or pipe arranged therein, and by tightening the screws the compressible body 708 (each semi-annular compressible body) will be axially compressed and by the expand in the radial direction (inwardly and outwardly) to accomplish sealing towards the cable or pipe and the surrounding structure. In the absence of a cable or pipe the core 706 will enable an adequate seal. A conductor arrangement, e.g. a braided wire 710, extends around the circumference of the compressible body 708, basically as is the case for previous embodiments.

In one or more of the above embodiments the braided wire may be replaced by another electrical connector. One important features of such an alternative electrical connector is that it should be flexible enough to absorb longitudinal compression or elongation without it affecting its properties in a significant way. Also, the connector should comprise two or more conductors. To this end it may be noted that a metallic tape or strip may have limitations its performance, since an elongation may result in the forming of a rupture, on a visible or non-visible scale and a compression may result in the formation of wrinkles, which may be a problem for very high currents. It may also be pointed out that even the process of folding the tape or strip around a corner will affect the internal resistance significantly, which also may be a problem when subjected to high currents. To put the effect in perspective; it will generally be significantly more difficult for the current to pass the corner than to pass from the cable to the tape or strip, resulting in that the corner will be a limiting factor for the performance of such a system. For many applications this may not be a problem, and existing systems utilizing a tape or strip may fulfill their purpose. The use of several (at least two or more, and generally far more than two) conductors in the connector will not exhibit this problem, partly since each conductor is of smaller dimensions and is more flexible. A further advantage of using several conductors is that for the same effective cross section area as a single larger conductor, several smaller conductors will exhibit a significantly larger surface area. This feature has several beneficial effects, e.g. for the transportation of high frequencies due to the so-called skin effect the multitude of conductors is beneficial for other situations too.

Some alternatives to the braided wire would be e.g. a knitted wire, a woven wire, a wire cloth or a wire mesh; or more generally put at least two effective conductors each arranged to follow a non-linear path. Some or even most knitted wires actually make use of a single conductor only, yet that single conductor is arranged to form more than one effective conductor, which is one relevant property for the purposes of the present invention and embodiments thereof. Even if the individual connectors of such an alternative conductor arrangement may follow a non-linear path, the conductor arrangement as such may for certain have a general direction. A braided wire may still have the benefit over other alternatives in that the non-linear path of its conductors still may not result in an overly long path for the current to travel.

Figure 9:
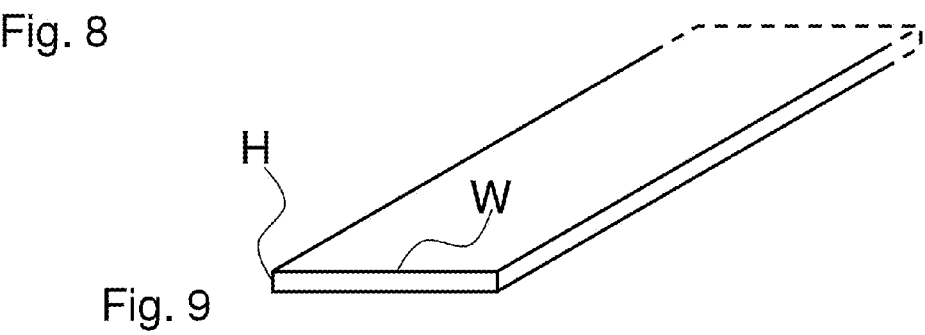
FIG. 9 is a schematic perspective view of a length of conductor arrangement, illustrating a height direction and a width direction thereof.

Referring to FIG. 9, the cross section of the conductor arrangement is preferably elongate, with the width, W, exceeding the height, H (or thickness). Preferred range is that the height is less than 50% of the width, in one or more embodiments less than 30% of the width, and on one or more embodiments about 20% of the width. Even more flattened cross sections are foreseen. Some braided wires used have a height to width ratio of between about 1/20 to 1/10 in a flattened state.

The skilled person realizes that there are limits for the amount of compression or elongation that any conductor may absorb, yet the skilled person also realizes that the parameters should be read within the context of the present invention. In the disclosed embodiments a braided wire has been used, since this is presently the preferred solution. It should be emphasized though, that any one of the alternative conductor arrangements or the generalization thereof, may replace the braided wire in those embodiments. The practical performance of the embodiment may vary with the choice of conductor arrangement, yet for the purposes of describing the various configurations a straightforward replacement procedure may be applied. A full description of each alternative embodiment is therefore considered superfluous.

The features of a modular connector according the present invention and in accordance with the appended claims may be fulfilled by each connector half, more particular the modular connector may comprise two connector halves as the ones illustrated in the drawings of the present invention. However, it should be noted that the features of the claimed invention will be fulfilled for an assembly comprising one connector half according to the present description, and one regular connector half. Regular meaning that the connector half lacks the braided wire and arrangements accommodating the braided wire, i.e. a connector half according to prior art. A preferred assembly, however, does comprise two connector halves as described in the present description.

A method for assembly of a modular connector according to one or more embodiments thereof may comprise the steps of:

providing a modular connector for cables or pipes, comprising a compressible body, having an axial groove provided therein for arrangement of a shielded or armored cable or a pipe extending from a first end to a second end, wherein the groove is dimensioned or dimensionable to sealingly fit around a circumference of the shielded or armored cable, or pipe, the modular connector, comprising a conductor arrangement (-10) arranged between the first end and the second end arranging a cable or pipe in the axial groove, effectively sandwiching a portion of the conductor arrangement between the cable or pipe and the axial groove, According to one or more embodiments the method may comprise one or several of the below mentioned method steps:

Removing an electrically insulating outer layer of the cable or pipe prior to arranging it in the groove.

Adjusting an effective diameter of the axial groove by means of removing peelable layers of material arranged in the axial groove, Arranging a free end of a conductor arrangement along a surface of the groove, and optionally the step of:

Adjusting the effective diameter of the axial groove a different amount along the length of the axial groove by removing or adding a different number of layers, or by inserting one or more inlays of varying thickness along the length of the axial groove.

Using the present invention according to any embodiment thereof enables adequate sealing. There are obviously different degrees of sealing (hence "adequate") yet while remaining within the scope of the present invention a modular connector may seal against fluid, gas, fire, rodents, termites, dust, moisture etc., and may receive cables or wires for electricity, communication, computers etc., pipes for different gases or liquids such as water, compressed air, hydraulic fluid and cooking gas or wires for load retention. In many embodiments it may be preferred that the free ends of the braided wire, or of the alternative conductor arrangement used, meet in the groove. This maximizes the contact area between the braided wire and the cable. If the free ends of the braided wire, or of any other alternative conductor arrangement as defined in the present application, corresponds to the length of braided wire extending inwardly beyond an edge of the groove, it is preferred that the total length of the free edges corresponds to the inner circumference of the groove. If the groove is semicylindrical this corresponds to half the circumference of the corresponding circle or $\pi*D*0.5$, where D corresponds to the diameter of the groove. In embodiments where the dimensions of the groove is variable the total length of the free ends corresponds to the above requirement being fulfilled for the largest groove. If smaller groove dimensions are used the conductor arrangement is trimmed. It is preferred that the free ends to not overlap, and it should be noted that a distance between the free ends in an assembled position will be acceptable for many embodiments. The total length of the free ends of the conductor arrangement may be about 50-100% of the inner circumference of the groove, preferably 70-100% thereof and even more preferred is between 90-100% thereof. In FIG. 2, reference numeral 234 point to the a double-headed arrow indicating the length of a first free end, and addition of the length of the opposing free end, defined in the same way, results in the total length of the free ends.

Figure 8:
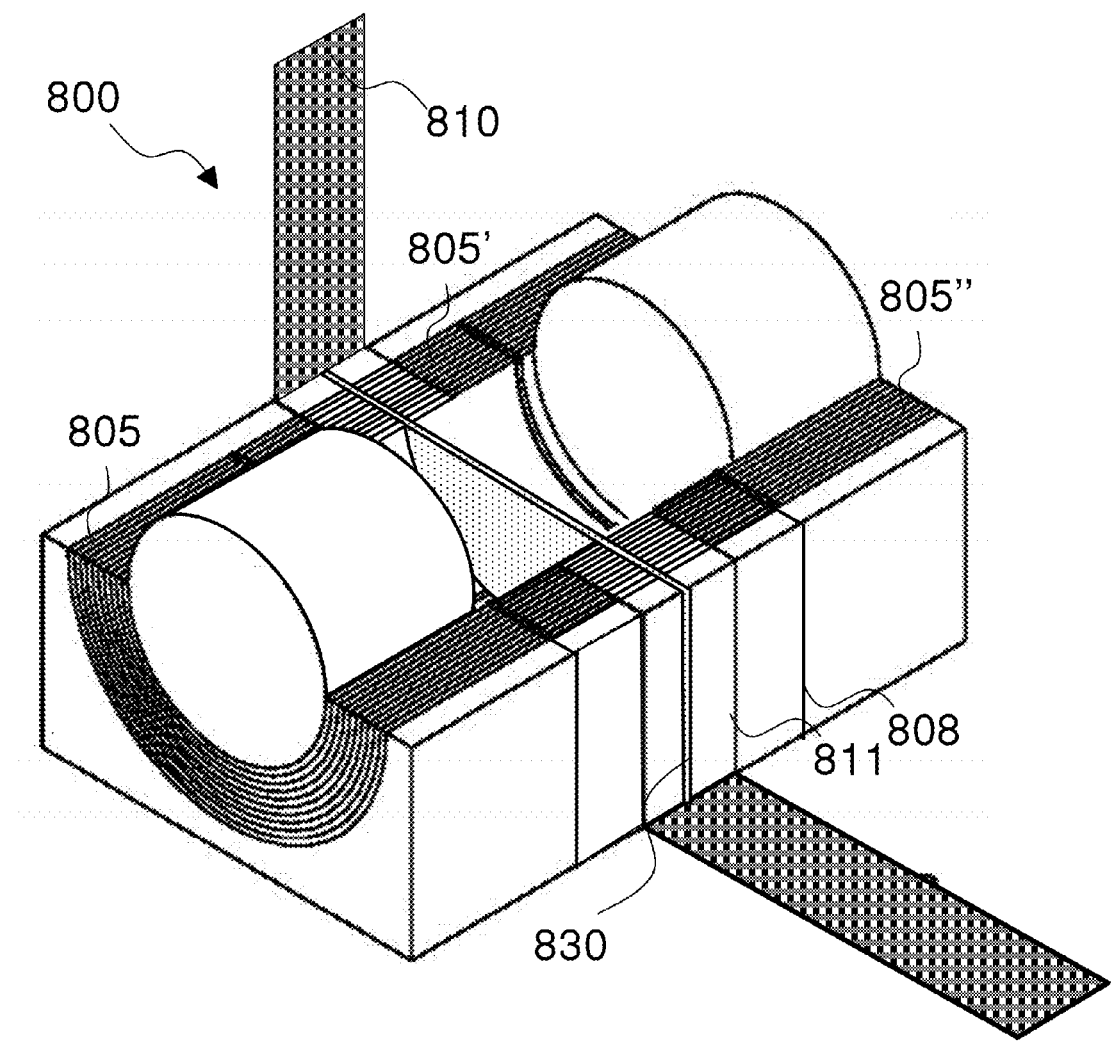
FIG. 8 is a perspective view of a first half of a modular connector in accordance with a sixth embodiment thereof.

In any embodiment the connector module may have an additional functionality; as is described referring to FIG. 8. By incorporating a section of a conductive material the connector module 800 may provide a protection against radio-frequency interference. The conductive material should be in electrical contact with the braided wire 810, which in FIG. 8 has been folded out of its recess 811 for the conductive section 830 to be seen. The section of conductive material may be provided as an actual section, namely that a conductive layer 830 is sandwiched or otherwise arranged in the compressible module 800, in a direction effectively orthogonal to the axial groove. In such an embodiment the section protrudes through the layers of peelable material 805', which are effectively divided into two stacks of peelable material (when such layers are arranged). In practice this corresponds to arranging a compressible body 808 on either side of the section of conductive material, wherein the groove of each compressible body is aligned and wherein peelable layers 805' of material optionally are arranged in each groove. By arranging the recess 811 and the braided wire 810 in the area of the conductive section 830 electrical contact between the conductive section and the braided wire may be ensured. Also, in the embodiment of FIG. 8 the conductive section 830 has a rectangular shape and extends into the groove, thus ensuring electrical contact to a cable or pipe arranged therein. The amount of conductive material extending into the groove may be reduced, simply by tearing or cutting in that portion of the material. In still other embodiments the conductive section may be accomplished by admixture of conductive particles into the entire volume of e.g. the compressible body 805' and any peelable sheets of material present between the compressible body 805' and the cable or pipe arranged in the groove. The latter solution is generally more costly than the former, which makes it less beneficial, at least as the situation is presently. These embodiments provide a protection against EMI (Electromagnetic Interference) or RFI (Radio Frequency Interference), and the connector module as a whole will thus provide protection against many electrical failures (lightning, short-circuits etc) and airborne interferences. It should be obvious that the embodiment of FIG. 8 is exemplifying only and that the teachings e.g. may be applied to the embodiments of FIGS. 2, 3 and 5 as well as on combinations thereof.

In the description of the embodiments a cable having a screen or jacket has been used as an example, since this is the apparent usage at this time. However, pipes (of an electrically conductive material) as well as other conductors, such as busbars and regular wiring may also be used in combination with the present invention, according to one or more embodiments thereof. The peelable sheets as described in the present invention are preferably made from a resilient material, similar to the material of the compressible body, preferably EPDM rubber with a suitable filler.

A modular system of the present invention enables arrangement of several cables or pipes within one single frame, yet it also enables a flexible arrangement of a single cable. According to one or several embodiments a frame and compression unit in accordance with the description of FIG. 1 may be provided, yet there are several compression units and configurations which may be used. The skilled person may find more information in previous patent applications by the present applicant and product information is readily available via the homepage of the present applicant.

The invention claimed is:

1. A modular connector for cables or pipes, comprising:
at least one compressible body with an axial groove provided therein for arrangement of a shielded or armored cable or a pipe extending from a first end to a second end, wherein the groove is dimensioned or dimensionable to sealingly fit around a circumference of the shielded or armored cable, or pipe, wherein the modular connector comprises two connector halves,
wherein at least one connector half comprises a unitary flexible conductor arrangement, which conductor arrangement comprises having at least two interwoven conductors arranged to follow a non-linear path, arranged between the first end and the second end, wherein the conductor arrangement is also arranged to be sandwiched between the compressible body and a cable screen or armor of the cable, or the pipe, the conductor arrangement further extending to an outside of the modular connector for cables or pipes.

2. The modular connector of claim 1, wherein a longitudinal direction of the conductor arrangement is essentially orthogonal to the axial groove.

3. The modular connector of claim 1, wherein at least one peelable sheet is arranged in two or more separate sections along the axial extension of the modular connector.

4. The modular connector of claim 1, wherein the compressible body comprises a recess through which the conductor arrangement extends to the outside of the modular connector.

5. The modular connector of claim 4, wherein the recess extends along the full, or a part of, the outer circumference of the compressible body.

6. The modular connector of claim 5, wherein a thickness of the conductor arrangement exceeds the depth of the recess.

7. The modular connector of claim 1, wherein at least one peelable sheet of material is arranged in the axial groove, for adjusting a diameter to dimensions of the shielded or armored cable or the pipe.

8. The modular connector of claim 7, wherein at least two separate sections of at least one peelable sheet are arranged along a length of the axial groove in order to adjust the diameter to varying dimensions of the shielded or armored cable, or pipe.

9. The modular connector of claim 1, wherein the conductor arrangement having at least two conductors arranged to follow a non-linear path is selected from the group comprising: a braided wire, a knitted wire, woven wire, a wire mesh, and a wire cloth.

10. The modular connector of claim 1, wherein a total length of the free ends of the conductor arrangement is about 50-100% of the inner circumference of the groove, preferably 70-100% thereof and even more preferred is between 90-100% thereof, or more.

11. An assembly comprising two connector halves forming a modular connector according to claim 1.

12. A connector system, comprising a modular connector according to claim 1, further comprising a compression means for exerting a pressure on the outer side of the compressible body of the connector, wherein the pressure is transferable to the axial groove for reducing the radial dimensions thereof.

13. A method for manufacture of a modular connector according to claim 1, comprising the steps of:

providing a compressible body having an axial groove therein, the compressible body being formed from a resilient material, arranging conductor arrangement to the compressible body, between a first end and a second end thereof, extending from the axial groove to an outside of the modular connector.

14. The method of claim 13, further comprising the step of providing a recess in the compressible body, in which recess conductor arrangement is arranged in a subsequent step.

15. The method of claim 14, wherein the recess is provided extending from one lateral edge of the axial groove, orthogonally to the axial groove, around a circumference of the compressible body, to an opposing lateral edge of the axial groove.

16. The method of claim 15, further comprising the step of arranging an adhesive between the recess and the conductor arrangement so as to bond the conductor arrangement to the recess.

17. A modular connector for cables or pipes, comprising:
at least one compressible body with an axial groove provided therein for arrangement of a shielded or armored cable or a pipe extending from a first end to a second end, wherein the groove is dimensioned or dimensionable to sealingly fit around a circumference of the shielded or armored cable, or pipe, wherein the modular connector comprises two connector halves,
wherein at least one connector half comprises a flexible conductor arrangement in the form of a braided wire, arranged between the first end and the second end, wherein the braided wire is also arranged to be sandwiched between the compressible body and a cable screen or armor of the cable, or the pipe, the braided wire further extending to an outside of the modular connector for cables or pipes.

18. The modular connector of claim 17, wherein there is a single braided wire.

19. The modular connector of claim 17, wherein a total length of the free ends of the conductor arrangement is about 50-100% of the inner circumference of the groove, preferably 70-100% thereof and even more preferred is between 90-100% thereof, or more.

20. An assembly comprising two connector halves forming a modular connector according to claim 17.

21. A connector system, comprising a modular connector according to claim 17, further comprising a compression means for exerting a pressure on the outer side of the compressible body of the connector, wherein the pressure is transferable to the axial groove for reducing the radial dimensions thereof.

22. A method for manufacture of a modular connector according to claim 17, comprising the steps of:
providing a compressible body having an axial groove therein, the compressible body being formed from a resilient material,
arranging conductor arrangement to the compressible body, between a first end and a second end thereof, extending from the axial groove to an outside of the modular connector.

23. A modular connector for cables or pipes, comprising:
at least one compressible body with an axial groove provided therein for arrangement of a shielded or armored cable or a pipe extending from a first end to a second end, wherein the groove is dimensioned or dimensionable to sealingly fit around a circumference of the shielded or armored cable, or pipe, wherein the modular connector comprises two connector halves,
wherein at least one connector half comprises a unitary flexible conductor arrangement, which conductor arrangement comprises at least two interwoven conductors arranged to follow a non-linear path, arranged between the first end and the second end, wherein the conductor arrangement is also arranged to be sandwiched between the compressible body and a cable screen or armor of the cable, or the pipe, the conductor arrangement further extending to an outside of the modular connector for cables or pipes, wherein at least one peelable sheet is arranged in two or more separate sections along the axial extension of the groove of the modular connector.

24. The modular connector of claim 23, wherein the compressible body comprises a recess through which conductor arrangement extends to the outside of the modular connector, the recess further extending along the full, or a part of, the outer circumference of the compressible body.

25. The modular connector of claim 24, wherein a thickness of the conductor arrangement exceeds the depth of the recess.

26. The modular connector of claim 23, wherein a total length of the free ends of the conductor arrangement is about 50-100% of the inner circumference of the groove, preferably 70-100% thereof and even more preferred is between 90-100% thereof, or more.

27. An assembly comprising two connector halves forming a modular connector according to claim 23.

28. A connector system, comprising a modular connector according to claim 23, further comprising a compression means for exerting a pressure on the outer side of the compressible body of the connector, wherein the pressure is transferable to the axial groove for reducing the radial dimensions thereof.

29. A method for manufacture of a modular connector according to claim 23, comprising the steps of:
providing a compressible body having an axial groove therein, the compressible body being formed from a resilient material,
arranging conductor arrangement to the compressible body, between a first end and a second end thereof, extending from the axial groove to an outside of the modular connector.

\* \* \* \* \*